US007852792B2

(12) United States Patent
Cao et al.

(10) Patent No.: US 7,852,792 B2
(45) Date of Patent: Dec. 14, 2010

(54) PACKET BASED ECHO CANCELLATION AND SUPPRESSION

(75) Inventors: Binshi Cao, Bridgewater, NJ (US); Doh-Suk Kim, Basking Ridge, NJ (US); Ahmed A. Tarraf, Bayonne, NJ (US); Donald Joseph Youtkus, Basking Ridge, NJ (US)

(73) Assignee: Alcatel-Lucent USA Inc., Murray HIll, NJ (US)

( * ) Notice: Subject to any disclaimer, the term of this patent is extended or adjusted under 35 U.S.C. 154(b) by 1121 days.

(21) Appl. No.: 11/523,051

(22) Filed: Sep. 19, 2006

(65) Prior Publication Data

US 2008/0069016 A1 Mar. 20, 2008

(51) Int. Cl.
*H04B 3/20* (2006.01)

(52) U.S. Cl. ...................................... 370/289; 455/570

(58) Field of Classification Search ......... 370/286–292; 455/570

See application file for complete search history.

(56) References Cited

U.S. PATENT DOCUMENTS 5,745,871 A * 4/1998 Chen .......................... 704/207
6,011,846 A 1/2000 Rabipour et al.
6,577,606 B1 * 6/2003 Lee et al. .................... 370/290
6,804,203 B1 * 10/2004 Benyassine et al. ......... 370/286
2004/0076271 A1 * 4/2004 Koistinen et al. ........ 379/88.11
2004/0083107 A1 * 4/2004 Noda et al. ................. 704/270
2006/0217971 A1 * 9/2006 Sukkar et al. ............... 704/219

FOREIGN PATENT DOCUMENTS

EP 1 521 240 A1 4/2005

OTHER PUBLICATIONS

International Search Report and Written Opinion of the International Searching Authority (dated Jan. 30, 2008) for counterpart International application No. PCT/US2007/020162 is provided for the purposes of certification under 37 C.F.R. §§ 1.97(e) and 1.704(d).

Chandran R. et al., "Compressed domain noise reduction and echo suppression for network speech enhancement," Circuits and Systems, 2000. Proceedings of the 43$^{rd}$ IDDD Midwest Symposium on Aug. 8-11, 200, Iscataway, NJ, IEEE, vol. 1, Aug. 8, 2000, pp. 10-13. * Section IV*.

Beaugeant C. et al., "Gain loss control based on speech codec parameters," Proceedings of the European Signal Processing Conference, Sep. 6, 2004, pp. 1-4. *Section 1,4*.

* cited by examiner

*Primary Examiner*—Brian D Nguyen
(74) *Attorney, Agent, or Firm*—Harness, Dickey & Pierce PLC

(57) ABSTRACT

In a method for echo suppression or cancellation, a reference voice packet is selected from a plurality of reference voice packets based on at least one encoded voice parameter associated with each of the plurality of reference voice packets and the targeted voice packet. Echo in the targeted packet is suppressed or cancelled based on the selected reference voice packet.

18 Claims, 3 Drawing Sheets

PACKET BASED ECHO CANCELLATION AND SUPPRESSION

BACKGROUND OF THE INVENTION

In conventional communication systems, an encoder generates a stream of information bits representing voice or data traffic. This stream of bits is subdivided and grouped, concatenated with various control bits, and packed into a suitable format for transmission. Voice and data traffic may be transmitted in various formats according to the appropriate communication mechanism, such as, for example, frames, packets, subpackets, etc. For the sake of clarity, the term "transmission frame" will be used herein to describe the transmission format in which traffic is actually transmitted. The term "packet" will be used herein to describe the output of a speech coder. Speech coders are also referred to as voice coders, or "vocoders," and the terms will be used interchangeably herein.

A vocoder extracts parameters relating to a model of voice information (such as human speech) generation and uses the extracted parameters to compress the voice information for transmission. Vocoders typically comprise an encoder and a decoder. A vocoder segments incoming voice information (e.g., an analog voice signal) into blocks, analyzes the incoming speech block to extract certain relevant parameters, and quantizes the parameters into binary or bit representation. The bit representation is packed into a packet, the packets are formatted into transmission frames and the transmission frames are transmitted over a communication channel to a receiver with a decoder. At the receiver, the packets are extracted from the transmission frames, and the decoder unquantizes the bit representations carried in the packets to produce a set of coding parameters. The decoder then re-synthesizes the voice segments, and subsequently, the original voice information using the unquantized parameters.

Different types of vocoders are deployed in various existing wireless and wireline communication systems, often using various compression techniques. Moreover, transmission frame formats and processing defined by one particular standard may be rather significantly different from those of other standards. For example, CDMA standards support the use of variable-rate vocoder frames in a spread spectrum environment while GSM standards support the use of fixed-rate vocoder frames and multi-rate vocoder frames. Similarly, Universal Mobile Telecommunications Systems (UMTS) standards also support fixed-rate and multi-rate vocoders, but not variable-rate vocoders. For compatibility and interoperability between these communication systems, it may be desirable to enable the support of variable-rate vocoder frames within GSM and UMTS systems, and the support of non-variable rate vocoder frames within CDMA systems. One common occurrence throughout all communications systems is the occurrence of echo. Acoustic echo and electrical echo are example types of echo.

Acoustic echo is produced by poor voice coupling between an earpiece and a microphone in handsets and/or hands-free devices. Electrical echo results from 4-to-2 wire coupling within PSTN networks. Voice-compressing vocoders process voice including echo within the handsets and in wireless networks, which results in returned echo signals with highly variable properties. The echoed signals degrade voice call quality.

In one example of acoustic echo, sound from a loudspeaker is heard by a listener at a near end, as intended. However, this same sound at the near end is also picked up by the microphone, both directly and indirectly, after being reflected. The result of this reflection is the creation of echo, which, unless eliminated, is transmitted back to the far end and heard by the talker at the far end as echo.

FIG. 1 illustrates a voice over packet network diagram including a conventional echo canceller/suppressor used to cancel echoed signals.

If the conventional echo canceller/suppressor 100 is used in a packet switched network, the conventional echo canceller must completely decode the vocoder packets associated with voice signals transmitted in both directions to obtain echo cancellation parameters because all conventional echo cancellation operations work with linear uncompressed speech. That is, the conventional echo canceller/suppressor 100 must extract packet from the transmission frames, unquantize the bit representations carried in the packets to produce a set of coding parameters, and re-synthesize the voice segments before canceling echo. The conventional echo canceller/suppressor then cancels echo using the re-synthesized voice segments.

Because transmitted voice information is encoded into parameters (e.g., in the parametric domain) before transmission and conventional echo suppressors/cancellers operate in the linear speech domain, conventional echo cancellation/suppression in a packet switched network becomes relatively difficult, complex, may add encoding and/or decoding delay and/or degrade voice quality because of, for example, the additional tandeming coding involved.

SUMMARY OF THE INVENTION

Example embodiments are directed to methods and apparatuses for packet-based echo suppression/cancellation. One example embodiment provides a method for suppressing/cancelling echo. In this example embodiment, a reference voice packet is selected from a plurality of reference voice packets based on at least one encoded voice parameter associated with each of the plurality of reference voice packets and a targeted voice packet. Echo in the targeted voice packet is suppressed/cancelled based on the selected reference voice packet.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EXAMPLE EMBODIMENTS

Methods and apparatuses, according to example embodiments, may perform echo cancellation and/or echo suppression depending on, for example, the particular application within a packet switched communication system. Example embodiments will be described herein as echo cancellation/suppression, an echo canceller/suppressor, etc.

Hereinafter, for example purposes, vocoder packets suspected of carrying echoed voice information (e.g., voice information received at the near end and echoed back to the far end) will be referred to as targeted packets, and coding parameters associated with these targeted packets will be referred to as targeted packet parameters. Vocoder or parameter packets associated with originally transmitted voice information (e.g., potentially echoed voice information) from the far end used to determine whether targeted packets include echoed voice information will be referred to as reference packets. The coding parameters associated with the reference packets will be referred to as reference packet parameters.

As discussed above, FIG. 1 illustrates a voice over packet network diagram including a conventional echo canceller/suppressor. Methods according to example embodiments may be implemented at existing echo cancellers/suppressors, such as the echo canceller/suppressor 100 shown in FIG. 1. For example, example embodiments may be implemented on existing Digital Signal Processors (DSPs), Field Programmable Gate Arrays (FPGAs), etc. In addition, example embodiments may be used in conjunction with any type of terrestrial or wireless packet switched network, such as, a VoIP network, a VoATM network, TrFO networks, etc.

One example vocoder used to encode voice information is a Code Excited Linear Prediction (CELP) based vocoder. CELP-based vocoders encode digital voice information into a set of coding parameters. These parameters include, for example, adaptive codebook and fixed codebook gains, pitch/adaptive codebook, linear spectrum pairs (LSPs) and fixed codebooks. Each of these parameters may be represented by a number of bits. For example, for a full-rate packet of Enhanced Variable Rate CODEC (EVRC) vocoder, which is a well-known vocoder, the LSP is represented by 28 bits, the pitch and its corresponding delta are represented by 12 bits, the adaptive codebook gain is represented by 9 bits and the fixed codebook gain is represented by 15 bits. The fixed codebook is represented by 120 bits.

Figure 1:
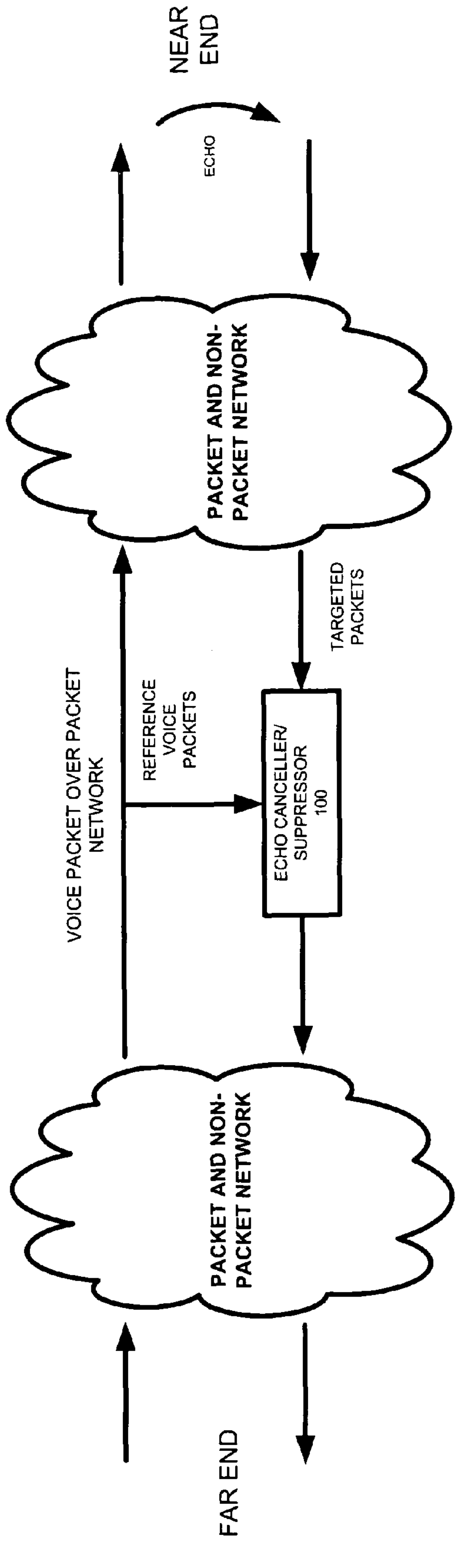
FIG. 1 is a diagram of a voice over packet network including a conventional echo canceller/suppressor.

Referring still to FIG. 1, if echoed speech signals are present during encoding of voice information by the CELP vocoder at the near end, at least a portion of the transmitted vocoder packets may include echoed voice information. The echoed voice information may be the same as or similar to originally transmitted voice information, and thus, vocoder packets carrying the transmitted voice information from the near end to the far end may be similar, substantially similar to or the same as vocoder packets carrying originally encoded voice information from the far end to the near end. That is, for example, the bits in the original vocoder packet may be similar, substantially similar, or the same as the bits in the corresponding vocoder packet carrying the echoed voice information.

Packet domain echo cancellers/suppressors and/or methods for the same, according to example embodiments, utilize this similarity in cancelling/suppressing echo in transmitted signals by adaptively adjusting coding parameters associated with transmitted packets.

For example purposes, example embodiments will be described with regard to a CELP-based vocoder such as an EVRC vocoder. However, methods and/or apparatuses, according to example embodiments, may be used and/or adapted to be used in conjunction with any suitable vocoder.

Figure 2:
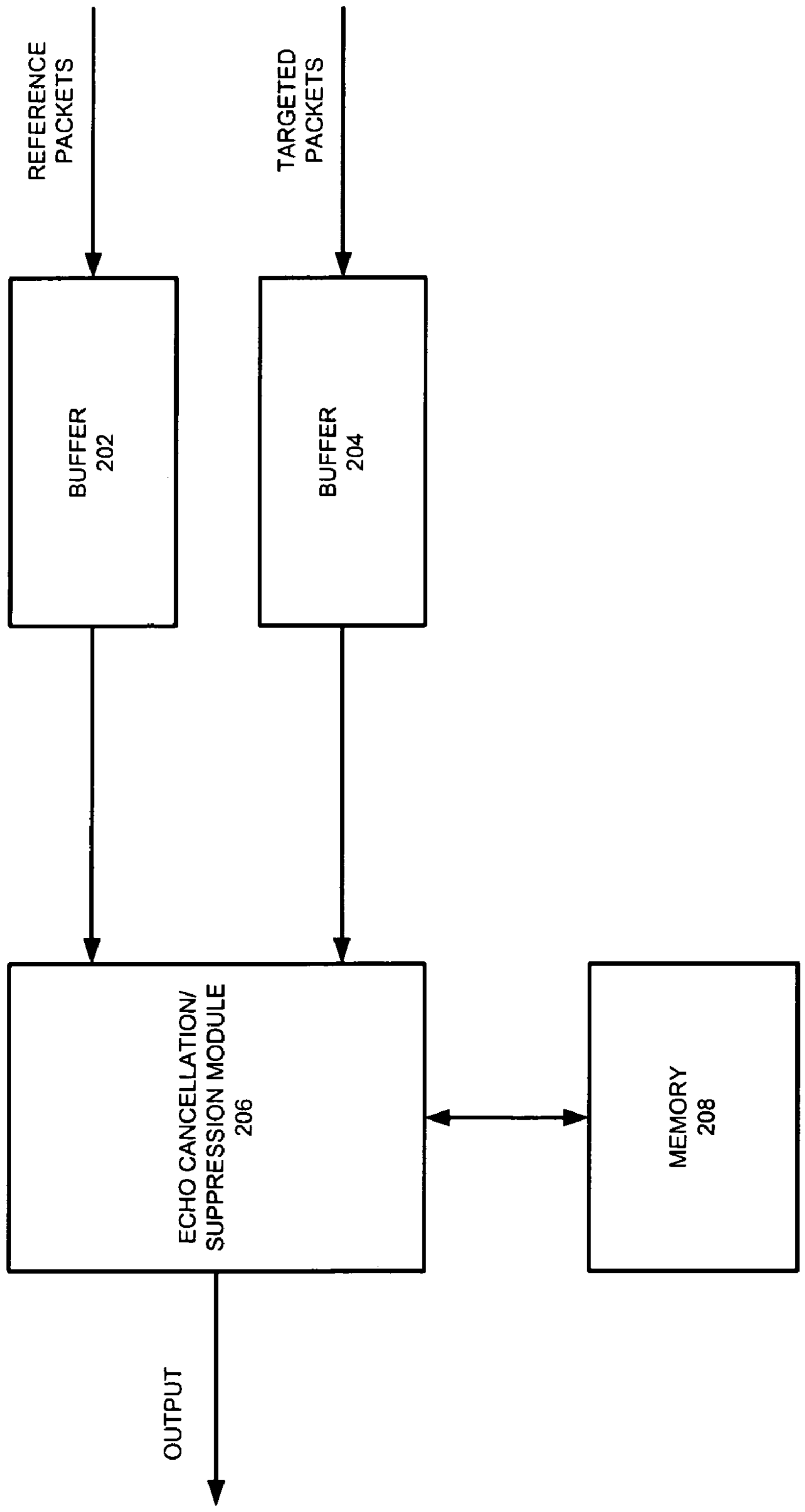
FIG. 2 illustrates an echo canceller/suppressor, according to an example embodiment.

FIG. 2 illustrates an echo canceller/suppressor, according to an example embodiment. As shown, the echo canceller/suppressor of FIG. 2 may buffer received original vocoder packets (reference packets) from the far end in a reference packet buffer memory 202. The echo canceller/suppressor may buffer targeted packets from the near end in a targeted packet buffer memory 204. The echo canceller/suppressor of FIG. 2 may further include an echo cancellation/suppression module 206 and a memory 208.

The echo cancellation/suppression module 206 may cancel/suppress echo from a signal (e.g., transmitted and/or received) signal based on at least one encoded voice parameter associated with at least one reference packet stored in the reference packet buffer memory 202 and at least one targeted packet stored in the targeted packet buffer 204. The echo cancellation/suppression module 206, and methods performed therein, will be discussed in more detail below.

The memory 208 may store intermediate values and/or voice packets such as voice packet similarity metrics, corresponding reference voice packets, targeted voice packets, etc. In at least on example embodiment, the memory 208 may store individual similarity metrics and/or overall similarity metrics. The memory 208 will be described in more detail below.

Returning to FIG. 2, the length of the buffer memory 204 may be determined based on a trajectory match length for a trajectory searching/matching operation, which will be described in more detail below. For example, if each vocoder packet carries a 20 ms voice segment and the trajectory match length is 120 ms, the buffer memory 204 may hold 6 targeted packets.

The length of the buffer memory 202 may be determined based on the length of the echo tail, network delay and the trajectory match length. For example, if each vocoder packet carries a 20 ms voice segment, the echo tail length is equal to 180 ms and the trajectory match length is 120 ms (e.g., 6 packets), the buffer memory 202 may hold 15 reference packets. The maximum number of packets that may be stored in buffer 202 for reference packets may be represented by m.

Although FIG. 2 illustrates two buffers 202 and 204, these buffers may be combined into a single memory.

In at least one example, the echo tail length may be determined and/or defined by known network parameters of echo path or obtained using an actual searching process. Methods for determining echo tail length are well-known in the art. After having determined the echo tail length, methods according to at least some example embodiments may be performed within a time window equal to the echo tail length. The time window width may be equivalent to, for example, one or several transmission frames in length, or one or several packets in length. For example purposes, example embodiments will be described assuming that the echo tail length is equivalent to the length of a speech signal transmitted in a single transmission frame.

Example embodiments may be applicable to any echo tail length by matching reference packets stored in buffer 202 with targeted packets carrying echoed voice information. Whether a targeted packet contains echoed voice information may be determined by comparing a targeted packet with each of m reference packets stored in the buffer 202.

Figure 3:
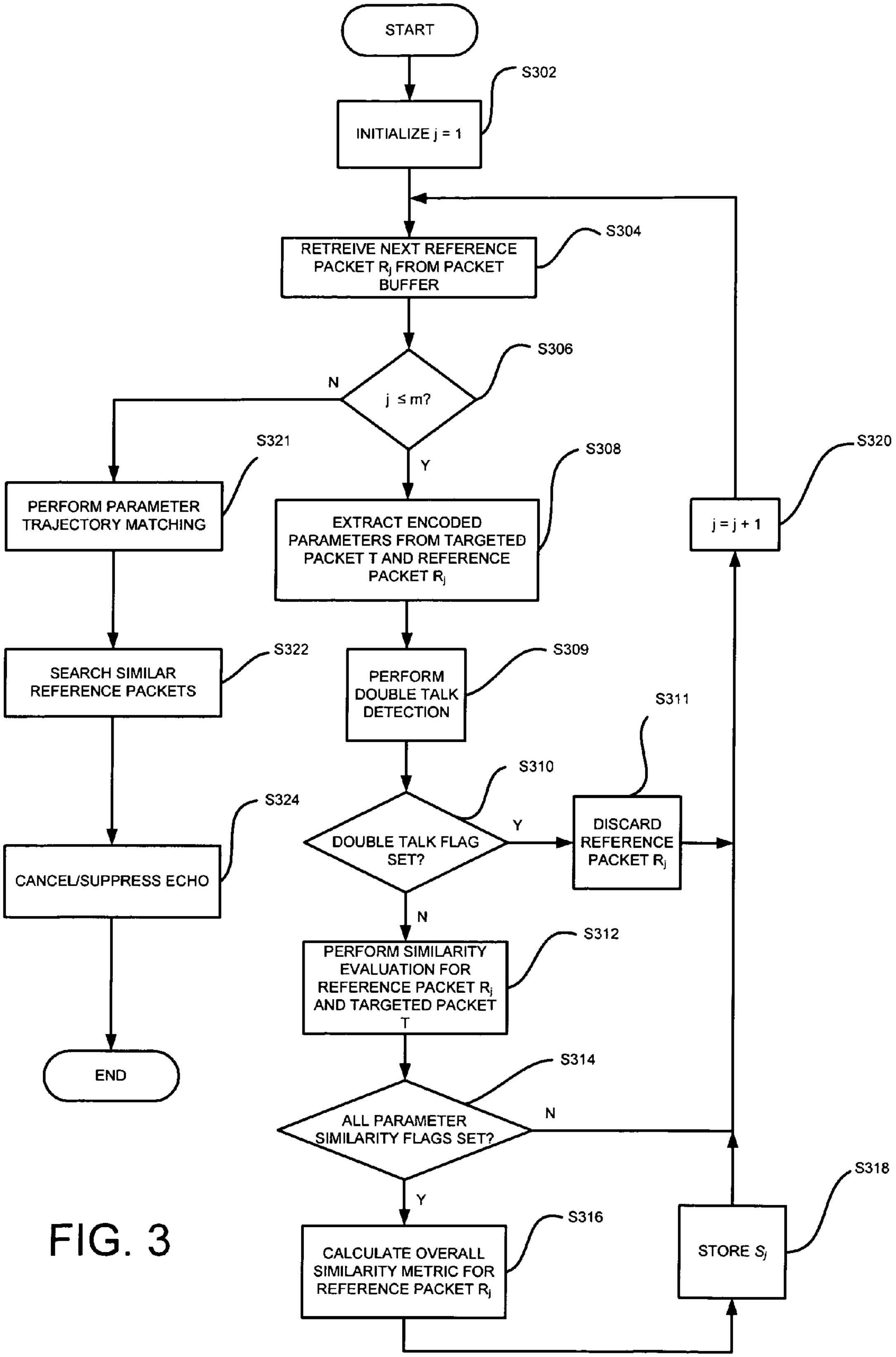
FIG. 3 illustrates a method for echo cancellation/suppression, according to an example embodiment.

FIG. 3 is a flow chart illustrating a method for echo cancellation/suppression, according to an example embodiment. The method shown in FIG. 3 may be performed by the echo cancellation/suppression module 206 shown in FIG. 2.

Referring to FIG. 3, at S302, a counter value j may be initialized to 1. At S304, a reference packet $R_j$ may be retrieved from the buffer 202. At S306, the echo cancellation/suppression module 206 may compare the counter value j to a threshold value m. As discussed above, m may be equal to the number of reference packets stored in the buffer 202. In this example, because the number of reference packets m stored in the buffer 202 is equal to the number of reference packets transmitted in a single transmission frame, the threshold value m may be equal to the number of packets transmitted in a single transmission frame. In this case, the value m may be extracted from the transmission frame header included in the transmission frame as is well-known in the art.

At S306, if the counter value j is less than or equal to threshold value m, the echo cancellation/suppression module 206 extracts the encoded parameters from reference packet $R_j$ at S308. Concurrently, at S308, the echo cancellation/suppression module 206 extracts encoded coding parameters from the targeted packet T. Methods for extracting these parameters are well-known in the art. Thus, a detailed discussion has been omitted for the sake of brevity. As discussed above, example embodiments are described herein with regard to a CELP-based vocoder. For a CELP-based encoder, the reference packet parameters and the targeted packet parameters may include fixed codebook gains $G_f$, adaptive codebook gains $G_a$, pitch P and an LSP.

Still referring to FIG. 3, at S309, the echo cancellation/suppression module 206 may perform double talk detection based on a portion of the encoded coding parameters extracted from the targeted packet T and the reference packet $R_j$ to determine whether double talk is present in the reference packet $R_j$. During voice segments including double talk, echo cancellation/suppression need not be performed because echoed far end voice information is buried in the near end voice information, and thus, is imperceptible at the far end.

Double talk detection may be used to determine whether a reference packet $R_j$ includes double talk. In an example embodiment, double talk may be detected by comparing encoded parameters extracted from the targeted packet T and encoded parameters extracted from the reference packet $R_j$. In the above-discussed CELP vocoder example, the encoded parameters may be fixed codebook gains $G_f$ and adaptive codebook gains $G_a$.

The echo cancellation/suppression module 206 may determine whether double talk is present according to the conditions shown in Equation (1):

$$\begin{cases} DT = 1, & \text{if } G_{fR} - G_{fT} < \Delta_f; \\ DT = 1, & \text{if } G_{aR} - G_{aT} < \Delta_a; \\ DT = 0, & \text{otherwise} \end{cases} \tag{1}$$

According to Equation (1), if the difference between the fixed codebook gain $G_{jR}$ for the reference packet $R_j$ and the fixed codebook gain $G_{fT}$ for the targeted packet T is less than a fixed codebook gain threshold value $\Delta_f$, double talk is present in the reference packet $R_j$ and the double talk detection flag DT may be set to 1 (e.g., DT=1). Similarly, if the difference between the adaptive codebook gain $G_{\alpha R}$ for the reference packet $R_j$ and the adaptive codebook gain $G_{\alpha T}$ for the targeted packet T is less than an adaptive codebook gain threshold value $\Delta_a$, double talk is present in the reference packet $R_j$ and the double talk detection flag DT may be set to 1 (e.g., DT=1). Otherwise, double talk is not present in the reference packet $R_j$ and the double talk detection flag may not be set (e.g., DT=0).

Referring back to FIG. 3, if the double talk detection flag DT is not set (e.g., DT=0) at S310, a similarity evaluation between the encoded parameters extracted from the targeted packet T and the encoded parameters extracted from the reference packet $R_j$ may be performed at S312. The similarity evaluation may be used to determine whether to set each of a plurality of similarity flags based on the encoded parameters extracted from the targeted packet T, the encoded parameters extracted from the reference packet $R_j$ and similarity threshold values.

The similarity flags may be referred to as similarity indicators. The similarity flags or similarity indicators may include, for example, a pitch similarity flag (or indicator) PM and a plurality of LSP similarity flags (or indicators). The plurality of LSP similarity flags may include a plurality of bandwidth similarity flags $BM_i$ and a plurality of frequency similarity matching flags $FM_i$.

Still referring to S312 of FIG. 3, the cancellation/suppression module 206 may determine whether to set the pitch similarity flag PM for the reference packet $R_j$ according to Equation (2):

$$\begin{cases} PM = 1, & \text{if } |P_T - P_R| \le \Delta_p; \\ PM = 0, & \text{if } |P_T - P_R| > \Delta_p; \end{cases} \tag{2}$$

As shown in Equation (2), $P_T$ is the pitch associated with the targeted packet, $P_R$ is the pitch associated with the reference packet $R_j$ and $\Delta_p$ is a pitch threshold value. The pitch threshold value $\Delta_p$ may be determined based on experimental data obtained according to the specific type of vocoder used. As shown in Equation (2), if the absolute value of the difference between the pitch $P_T$ and the pitch $P_R$ is less than or equal to the threshold value $\Delta_p$, the pitch $P_T$ is similar to the pitch $P_R$ and the pitch similarity flag PM may be set to 1. Otherwise, the pitch similarity flag PM may be set to 0.

Referring still to S312 of FIG. 3, similar to the above described pitch similarity evaluation method, an LSP similarity evaluation may be used to determine whether the reference packet $R_j$ is similar to a targeted packet T.

Generally, a CELP vocoder utilizes a $10^{th}$ order Linear Predictive Coding (LPC) predictive filter, which encodes 10 LSP values using vector quantization. In addition, each LSP pair defines a corresponding speech spectrum formant. A formant is a peak in an acoustic frequency spectrum resulting from the resonant frequencies of any acoustic system. Each particular formant may be expressed by bandwidth $B_i$ given by Equation (3):

$$B_i = LSP_{2i} - LSP_{2i-1}, i = 1, 2, \ldots, 5; \tag{3}$$

and center frequency $F_i$ given by Equation (4):

$$F_i = \frac{LSP_{2i} + LSP_{2i-1}}{2}, \quad i = 1, 2, \ldots, 5; \tag{4}$$

As shown in Equations (3) and (4), $B_i$ is the bandwidth of i-th formant, $F_i$ is the center frequency of i-th formant, and $LSP_{2i}$ and $LSP_{2i-1}$ are the i-th pair of LSP values.

In this example, for a $10^{th}$ order LPC predictive filter, 5 pairs of LSP values may be generated.

Each of the first three formants may include significant or relatively significant spectrum envelope information for a voice segment. Consequently, LSP similarity evaluation may be performed based on the first three formants i=1, 2 and 3.

A bandwidth similarity flag $BM_i$, indicating whether a bandwidth $B_{Ti}$ associated with a targeted packet T is similar to a bandwidth $B_{Ri}$ associated with the reference packet $R_j$, for each formant i, for i=1, 2, 3, may be set according to Equation (5):

$$\begin{cases} BM_i = 1, & \text{if } |B_{Ti} - B_{Ri}| \le \Delta_{Bi}; \\ BM_i = 0, & \text{if } |B_{Ti} - B_{Ri}| > \Delta_{Bi}; \end{cases} \quad (5)$$

$$i = 1,2,3.$$

As shown in Equation (5), $B_{Ti}$ is the i-th bandwidth associated with targeted packet T, $B_{Ri}$ is the i-th bandwidth associated with reference packet $R_j$ and $\Delta_{Bi}$ is the i-th bandwidth threshold used to determine whether the bandwidths $B_{Ti}$ and $B_{Ri}$ are similar. If $BM_i$=1, both i-th bandwidths $B_{Ti}$ and $B_{Ri}$ are within a certain range of one another and may be considered similar. Otherwise, when $BM_i$=0, the i-th bandwidths $B_{Ti}$ and $B_{Ri}$ may not be considered similar. Similar to the pitch threshold, each bandwidth threshold may be determined based on experimental data obtained according to the specific type of vocoder used.

Referring still to S312 of FIG. 3, whether an i-th frequency associated with the targeted packet T is similar to a corresponding i-th frequency associated with the reference packet $R_j$ may be indicated by a frequency similarity flag $FM_i$. The frequency similarity flag $FM_i$ may be set according to Equation (6):

$$\begin{cases} FM_i = 1, & \text{if } |F_{Ti} - F_{Ri}| \le \Delta_{Fi}; \\ FM_i = 0, & \text{if } |F_{Ti} - F_{Ri}| > \Delta_{Fi}; \end{cases} \quad (6)$$

$$i = 1,2,3.$$

In Equation (6), $F_{Ti}$ is the i-th center frequency associated with targeted packet T, $F_{Ri}$ is the i-th center frequency associated with reference packet $R_j$ and $\Delta_{Fi}$ is an i-th center frequency threshold. The i-th center frequency threshold $\Delta_{Fi}$ may be indicative of the similarity between i-th target and reference center frequencies $F_{Ti}$ and $F_{Ri}$, for i=1, 2 and 3. Similar to the pitch threshold and bandwidth thresholds, the frequency thresholds may be determined based on experimental data obtained according to the specific type of vocoder used.

$FM_i$ is a center frequency similarity flag for the i-th bandwidth for a corresponding LSP pair. According to Equation (6), an $FM_i$=1 indicates that $F_{Ti}$ and $F_{Ri}$ are similar, whereas $FM_i$=0, indicates that $F_{Ti}$ and $F_{Ri}$ are not similar.

Returning to FIG. 3, if at S314 it is determined that each of the plurality of parameter similarity flags PM, $BM_i$ and $FM_i$ are set equal to 1, the reference packet $R_j$ may be considered similar to the targeted packet T. In other words, the reference packet $R_j$ is similar to targeted packet T if each of the parameter similarity indicators PM, $BM_i$ and $FM_i$ indicate such.

The echo cancellation/suppression module 206 may then calculate an overall voice packet similarity metric at S316. The overall voice packet similarity metric may be, for example, an overall similarity metric $S_j$. The overall similarity metric $S_j$ may indicate the overall similarity between targeted packet T and reference packet $R_j$.

In at least one example embodiment, the overall similarity metric $S_j$ associated with reference packet $R_j$ may be calculated based on a plurality of individual voice packet similarity metrics. The plurality of individual voice packet similarity metrics may be individual similarity metrics.

The plurality of individual similarity metrics may be calculated based on at least a portion of the encoded parameters extracted from the targeted packet T and the reference packet $R_j$. In this example embodiment, the plurality of individual similarity metrics may include a pitch similarity metric $S_p$, bandwidth similarity metrics $S_{Bi}$, for i=1, 2 and 3, and frequency similarity metrics $S_{Fi}$, for i=1, 2 and 3. Each of the plurality of individual similarity metrics may be calculated concurrently.

For example the pitch similarity metric $S_p$ may be calculated according to Equation (7):

$$S_P = \frac{|P_T - P_R|}{|P_T + P_R|} \quad (7)$$

The bandwidth similarity $S_{Bi}$ for each of i formants may be calculated according to Equation (8):

$$S_{Bi} = \frac{|B_{Ti} - B_{Ri}|}{|B_{Ti} + B_{Ri}|} \quad (8)$$

$$i = 1,2,3.$$

As shown in Equation (8) and as discussed above, $B_{Ti}$ is the bandwidth of i-th formant for targeted packet T, and $B_{Ri}$ is the bandwidth of i-th formant for reference packet $R_j$.

Similarly, the center frequency similarity $S_{Fi}$ for each of i formants may be calculated according to equation (9):

$$S_{Fi} = \frac{|F_{Ti} - F_{Ri}|}{|F_{Ti} + F_{Ri}|} \quad (9)$$

$$i = 1,2,3;$$

As shown in Equation (9) and as discussed above, $F_{Ti}$ is the center frequency for the i-th formant for the targeted packet T and $F_{Ri}$ is the center frequency of the i-th formant for the reference packet $R_j$.

After obtaining the plurality of individual similarity metrics, the overall similarity matching metric $S_j$ may be calculated according to Equation (10):

$$S = \alpha_p S_p + \alpha_{LSP} \sum_i \frac{\beta_{Bi} S_{Bi} + \beta_{Fi} S_{Fi}}{2}; \quad (10)$$

In Equation (10), each individual similarity metric may be weighted by a corresponding weighting function. As shown, $\alpha_p$ is a similarity weighting constant for pitch similarity metric $S_p$, $\alpha_{LSP}$ is an overall similarity weighting constant for LSP spectrum similarity metrics $S_{Bi}$ and $S_{Fi}$, $\beta_{Bi}$ is an individual similarity weighting constant for the bandwidth similarity metric $S_{Bi}$ and $\beta_{Fi}$ is an individual similarity weighting constant for frequency similarity metric $S_{Fi}$.

The similarity weighting constants $\alpha_p$ and $\alpha_{LSP}$ may be determined so as to satisfy Equation (11) shown below.

$$\alpha_p + \alpha_{LSP} = 1; \quad (11)$$

Similarly, individual similarity weighting constants $\beta_{Bi}$ and $\beta_{Fi}$ may be determined so as to satisfy Equation (12) shown below.

$$\beta_{Bi} + \beta_{Fi} = 1; i = 1, 2, 3; \quad (12)$$

According to at least some example embodiments, the weighting constants may be determined and/or adjusted based on empirical data such that Equations (11) and (12) are satisfied.

Returning to FIG. 3, at S318, the echo cancellation/suppression module 206 may store the calculated overall similarity metric $S_j$ in memory 208 of FIG. 2. The memory 208 may be any well-known memory, such as, a buffer memory. The counter value j is incremented j=j+1 at S320, and the method returns to S304.

Returning to S314 of FIG. 3, if any of the parameter similarity flags are not set, the echo cancellation/suppression module 206 determines that the reference packet $R_j$ is not similar to the targeted packet T, and thus, the targeted packet T is not carrying echoed voice information corresponding to the original voice information carried by reference packet $R_j$. In this case, the counter value j may be incremented (j=j+1), and the method proceeds as discussed above.

Returning to S310 of FIG. 3, if double talk is detected in the reference packet $R_j$, the reference packet $R_j$ may be discarded at S311, the counter value j may be incremented j=j+1 at S320 and the echo cancellation/suppression module 206 retrieves the next reference packet $R_j$ from buffer 202, at S304. After retrieving the next reference packet $R_j$ from the buffer 202, the process may proceed to S306 and repeat.

Returning to S306, if the counter value j is greater than threshold m, a vector trajectory matching operation may be performed at S321. Trajectory matching may be used to locate a correlation between a fixed codebook gain for the targeted packet and each fixed codebook gain for the stored reference packets. Trajectory matching may also be used to locate a correlation between the adaptive codebook gain for the targeted packet and the adaptive codebook gain for each reference packet vector. According to at least one example embodiment, vector trajectory matching may be performed using a Least Mean Square (LMS) and/or cross-correlation algorithm to determine a correlation between the targeted packet and each similar reference packet. Because LMS and cross-correlation algorithms are well-known in the art, a detailed discussion thereof has been omitted for the sake of brevity.

In at least one example embodiment, the vector trajectory matching may be used to verify the similarity between the targeted packet and each of the stored similar reference packets. In at least one example embodiment, the trajectory vector matching at S321 may be used to filter out similar reference packets failing a correlation threshold. Overall similarity metrics $S_j$ associated with stored similar reference packets failing the correlation threshold may be removed from the memory 208. The correlation threshold may be determined based on experimental data as is well-known in the art.

Although the method of FIG. 3 illustrates a vector trajectory matching step at S321, this step may be omitted as desired by one of ordinary skill in the art.

At S322, the remaining stored overall similarity metrics $S_j$ in the memory 208 may be searched to determine which of the similar reference packets includes echoed voice information. In other words, the similar reference packets may be searched to determine which reference packet matches the targeted packet. In example embodiments, the reference packet matching the targeted packet may be the reference packet with the minimum associated overall similarity metric $S_j$.

If the similarity metrics $S_j$ are indexed in the memory (methods for doing which are well-known, and omitted for the sake of brevity) by targeted packet T and reference packet $R_j$, the overall similarity metrics may be expressed as $S(T, R_j)$, for j=1, 2, 3 . . . m.

Representing the overall similarity metrics as $S(T, R_j)$, for j=1, 2, 3 . . . m, the minimum overall similarity metric $S_{min}$ may be obtained using Equation (13):

$$S_{min}=\mathrm{MIN}[S(T,R_j), j=0, 1, \ldots, m]. \tag{13}$$

Returning again to FIG. 3, after locating the matching reference packet, the echo cancellation/suppression module 206 may cancel/suppress echo based on a portion of the encoded parameters extracted from the matching reference packet at S324. For example, echo may be cancelled/suppressed by adjusting (e.g., attenuating) gains associated with the targeted packet T. The gain adjustment may be performed based on gains associated with the matched reference packet, a gain weighting constant and the overall similarity metric associated with the matching reference packet.

For example, echo may be cancelled/suppressed by attenuating adaptive codebook gains as shown in Equation (14):

$$G_{fR}'=W_f S^* G_{fRj} \tag{14}$$

and/or fixed codebook gains as shown in Equation (15):

$$G_{\alpha R}'=W_\alpha S^* G_{\alpha R} \tag{15}$$

As shown in Equation (14), $G_{fR}'$ is an adjusted gain for a fixed codebook associated with a reference packet, and $W_f$ is the gain weighting for the fixed codebook.

As shown in Equation (15), $G_{\alpha R}'$ is the adjusted gain for the adaptive codebook associated with the reference packet and $W_\alpha$ is the gain weighting for the adaptive codebook. Initially, both $W_f$ and $W_\alpha$ may be equal to 1. However, these values may be adaptively adjusted according to, for example, speech characteristics (e.g., voiced or unvoiced) and/or the proportion of echo in targeted packets relative to reference packets.

According to example embodiments, adaptive codebook gains and fixed codebook gains of targeted packets are attenuated. For example, based on the similarity of a reference and targeted packet, gains of adaptive and fixed codebooks in targeted packets may be adjusted.

According to example embodiments, echo may be canceled/suppressed using extracted parameters in the parametric domain without decoding and re-encoding the targeted voice signal.

Although only a single iteration of the method shown in FIG. 3 is discussed above, the method of FIG. 3 may be performed for each reference packet $R_j$ stored in the buffer 202 and each targeted packet T stored in the buffer 204. That is, for example, the plurality of reference packets stored in the buffer 202 may be searched to find a reference packet matching each of the targeted packets in the buffer 204.

The invention being thus described, it will be obvious that the same may be varied in many ways. Such variations are not to be regarded as a departure from the invention, and all such modifications are intended to be included within the scope of the invention.

We claim:

1. A method for suppressing echo, the method comprising:

selecting, from a plurality of reference voice packets, a reference voice packet based on at least one encoded voice parameter associated with each of the plurality of reference voice packets and a targeted voice packet; and suppressing echo in the targeted voice packet based on the selected reference voice packet, wherein the selecting step includes, extracting at least one encoded voice parameter from the targeted voice packet and each of the plurality of reference voice packets;

calculating, for each of a number of reference voice packets within the plurality of reference voice packets, at least one voice packet similarity metric based on the encoded voice parameter extracted from each of the plurality of reference voice packet and the targeted voice packet; and selecting the reference voice packet based on the calculated voice packet similarity metric.

2. The method of claim 1, wherein the echo is suppressed by adjusting a value of the at least one encoded voice parameter associated with the targeted voice packet based on the at least one encoded voice parameter associated with the selected reference voice packet.

3. The method of claim 2, wherein the echo is suppressed by adjusting values of a plurality of encoded voice parameters associated with the targeted voice packet based on a corresponding plurality of encoded voice parameters associated with the selected reference voice packet.

4. The method of claim 2, wherein the at least one encoded voice parameter associated with the targeted voice packet is a codebook gain.

5. The method of claim 1, wherein the echo is suppressed by adjusting a value of a gain of the at least one encoded voice parameter associated with the targeted voice packet based on a corresponding at least one encoded voice parameter associated with the selected reference voice packet.

6. The method of claim 1, further comprising:

determining which ones of the plurality of reference voice packets are similar to the targeted voice packet based on the encoded voice parameter associated with each reference voice packet and the targeted voice packet to generate the number of reference voice packets for which to calculate the at least one voice packet similarity metric.

7. A method for suppressing echo, the method comprising:

selecting, from a plurality of reference voice packets, a reference voice packet based on at least one encoded voice parameter associated with each of the plurality of reference voice packets and a targeted voice packet; and suppressing echo in the targeted voice packet based on the selected reference voice packet, wherein the selecting step includes, determining which ones of the plurality of reference voice packets are similar to the targeted voice packet based on the at least one encoded voice parameter associated with each of the plurality of reference voice packets and the targeted voice packet to generate a set of reference voice packets; and selecting the reference voice packet from the set of reference voice packets.

8. The method of claim 7, wherein the determining step comprises:

for each reference voice packet, setting at least one similarity indicator based on the at least one encoded voice parameter associated with the targeted voice packet and the at least one encoded voice parameter associated with the reference voice packet; and determining whether the reference voice packet is similar to the targeted voice packet based on the similarity indicator.

9. The method of claim 7, wherein the at least one encoded voice parameter associated with the reference voice packets includes at least one of a codebook gain, pitch, bandwidth and frequency.

10. The method of claim 7, wherein the determining step further comprises:

determining if double talk is present in each of the plurality of reference voice packets; and determining a reference voice packet is not similar to the targeted voice packet if double talk is present.

11. The method of claim 10, wherein double talk is present in a reference voice packet if a difference between a codebook gain associated with the reference voice packet and a codebook gain associated with the targeted voice packet is less than a threshold value.

12. The method of claim 7, wherein the at least one encoded voice parameter includes pitch, and the determining step further comprises:

for each reference voice packet, calculating an absolute value of a difference between a pitch associated with the targeted voice packet and a pitch associated with the reference voice packet, and determining whether the reference voice packet is similar to the targeted voice packet based on the calculated absolute value and a pitch threshold.

13. The method of claim 7, wherein the at least one encoded voice parameter includes at least a bandwidth, and the determining step further comprises:

for each of the plurality of reference voice packets, calculating at least one absolute value of a difference between a bandwidth associated with the targeted voice packet and a bandwidth associated with the reference voice packet, and determining whether the reference voice packet is similar to the targeted voice packet based on the at least one absolute value and a bandwidth threshold.

14. The method of claim 13, wherein the bandwidth associated with the reference voice packet is a bandwidth of a formant for voice information represented by the reference voice packet, and the bandwidth associated with the targeted voice packet is a bandwidth associated with a formant for voice information represented by the targeted voice packet.

15. The method of claim 7, wherein the at least one encoded voice parameter includes a frequency, and the determining step further comprises:

for each of the plurality of reference voice packets, calculating at least one absolute value of a difference between a frequency associated with the targeted voice packet and a frequency associated with the reference voice packet, and determining whether the reference voice packet is similar to the targeted voice packet based on the at least one absolute value and a frequency threshold.

16. The method of claim 15, wherein the frequency associated with the reference voice packet is a center frequency of at least one formant for voice information represented by the reference voice packet, and the frequency associated with the targeted voice packet is a center frequency of at least one formant for voice information represented by the targeted voice packet.

17. A method for suppressing echo, the method comprising:

selecting, from a plurality of reference voice packets, a reference voice packet based on at least one encoded voice parameter associated with each of the plurality of reference voice packets and a targeted voice packet; and suppressing echo in the targeted voice packet based on the selected reference voice packet, wherein the selecting step includes, extracting a plurality of encoded voice parameters from the targeted voice packet and each of the reference voice packets;

for each encoded voice parameter associated with each reference voice packet, determining an individual similarity metric based on the encoded voice parameter for the reference voice packet and the targeted voice packet;

for each reference voice packet, determining an overall similarity metric based on the individual similarity metrics associated with the reference voice packet; and selecting the reference voice packet based on the overall similarity metric associated with each reference voice packet.

18. The method of claim 17, wherein the selecting step further comprises:

comparing the overall similarity metrics to determine a minimum overall similarity metric; and selecting the reference voice packet associated with the minimum overall similarity metric.

* * * * *